March 24, 1964 R. K. ROCKWELL 3,126,491

EXCLUSIVE-SELECTOR GATING CIRCUIT

Filed Dec. 12, 1961 2 Sheets-Sheet 1

INVENTOR.

RONALD K. ROCKWELL

BY

[signature]

ATTORNEY

March 24, 1964 R. K. ROCKWELL 3,126,491

EXCLUSIVE-SELECTOR GATING CIRCUIT

Filed Dec. 12, 1961 2 Sheets-Sheet 2

INVENTOR.
RONALD K. ROCKWELL
BY
[signature]
ATTORNEY

United States Patent Office 3,126,491

Patented Mar. 24, 1964

3,126,491

EXCLUSIVE-SELECTOR GATING CIRCUIT

Ronald K. Rockwell, Old Bethpage, N.Y., assignor to Sperry Rand Corporation, Great Neck, N.Y., a corporation of Delaware Filed Dec. 12, 1961, Ser. No. 158,749
5 Claims. (Cl. 307—88.5)

This invention relates to a simplified selective gating circuit using unijunction transistors.

The present invention is useful in situations in which it is desired that input pulses received on any one of a plurality of input lines selectively energize only a corresponding one of a plurality of output lines and de-energize all other output lines. The energized output line is to remain energized until an input pulse is received on any one of the other input lines at which time the output line corresponding to the most recently pulsed input line is energized and all other output lines, including the previously energized output line, are de-energized. In one sense, the circuit may be thought of as a pulse-stretcher, in which the selection of the respective output lines and the duration of their energization is controlled entirely by the order and time interval between the pulsing of the input lines. The circuit may be used to advantage where the output gating pulses are to activate circuitry that is to respond only to specified input pulses and where the order and timing of the input pulses is random, in which case it would be impossible or undesirable to try to program the activation of the other circuitry to be compatible with the time and order of receipt of the input pulses.

It is an object of this invention to provide an exclusive-selector gating circuit which is simple and economical in design.

It is another object of this invention to provide a simplified gate generator in which pulses are received on any one of a plurality of input lines and a respective one of a corresponding plurality of output lines is energized to the exclusion of all other output lines.

These and other objects and advantages of the present invention will become more apparent from the following description and claims, taken in conjunction with the accompanying drawings in which:

Figure 1:
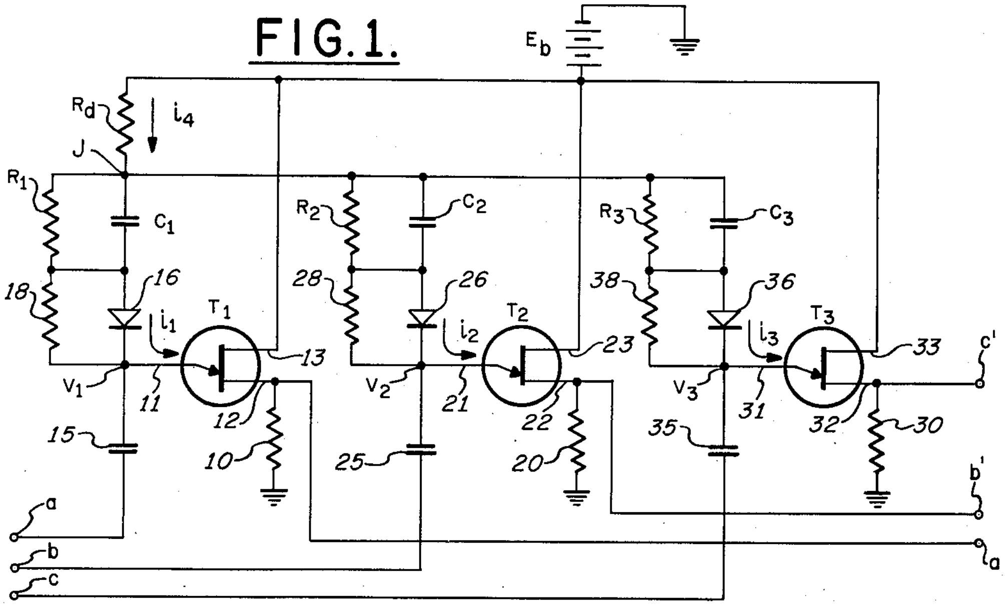
FIG. 1 is a schematic circuit diagram of the exclusive-selector gating circuit of this invention.

The circuit illustrated in FIG. 1 is comprised of three substantially identical gating circuits coupled to a voltage divider. The gating circuits include the devices $T_1$, $T_2$ and $T_3$ each of which represents a three-terminal semiconductor device known as a unijunction transistor, or double-base diode, of the type described in an article entitled "The Double-Base Diode-A New Semiconductor Device," I.R.E. Conventional Record, part 6, March 1953, pages 2–8. In these devices the three terminals are called emitter, base-one and base-two. The base-one and base-two terminals are ohmic base contacts on an n-type silicon bar and the emitter terminals is an aluminum wire which forms a p-n junction with the silicon bar. The unijunction transistor is characterized by a negative resistance emitter voltage-emitter current characteristic curve over a predetermined range of potentials applied between the emitter and base-one terminals of the device. The negative resistance emitter characteristic curve of a unijunction transistor has the general shape of the curve illustrated in FIG. 3. On the emitter characteristic curve of FIG. 3, the points of special interest are the peak voltage point $V_p$ and the valley voltage point $V_v$. The region to the left of the peak point is called the cutoff region. In this region the emitter to base-one diode junction is reverse biased and the transistor is cut off. The region between the peak point and valley point is the negative resistance region, and the region to the right of the valley point is the saturation region which has the normal positive resistance characteristic. In circuit applications, operation in the negative resistance region is only conditionally stable so that in most unijunction transistor circuits, including the circuit of this invention, the load line of the circuit is chosen to intercept the emitter characteristic curve in the saturation region to the right of the valley point. The unijunction transistor does not conduct until the emitter voltage $V_e$ exceeds the peak voltage $V_p$. After conduction commences, the emitter to base-one resistance decreases as the current through the junction increases so that conduction may be sustained with a decreased emitter voltage which is lower than the peak voltage $V_p$. In order to cut off the transistor, the emitter voltage $V_e$ must be decreased to a voltage below the characteristic curve of FIG. 3.

In FIG. 1, the emitter terminals of unijunction transistors $T_1$, $T_2$ and $T_3$ are 11, 21 and 31; the base-one terminals are 12, 22 and 32; and the base-two terminals are 13, 23 and 33. The three input terminals *a*, *b* and *c* are respectively coupled to emitter terminals 11, 21 and 31 by means of coupling capacitors 15, 25 and 35. The emitter terminals 11, 21 and 31 of transistors $T_1$, $T_2$ and $T_3$ also are coupled through diodes 16, 26 and 36 to voltage divider means wherein resistor $R_d$ comprises a higher voltage portion and the resistors $R_1$, $R_2$ and $R_3$ coupled in parallel thereto comprise the lower voltage portions of said voltage divider. Diodes 16, 26 and 36 are poled for unidirectional current flow through the respective voltage divider means just recited, through emitter terminals 11, 21 and 31 to the respective base-one terminals 12, 22 and 32. Diodes 16, 26 and 36 serve as isolating means for preventing input pulses coupled to a given transistor from coupling between stages and erroneously triggering another transistor. Capacitors $c_1$, $c_2$ and $c_3$ respectively shunt the correspondingly numbered resistors $R_1$, $R_2$ and $R_3$. Capacitors $c_1$, $c_2$ and $c_3$ serve as coupling capacitors as described more fully below. Resistor $R_d$ is coupled at its upper end to the positive potential terminal of voltage source $E_b$ whose other terminal is grounded. Resistors 18, 28 and 38 serve as bleeder resistors to prevent diodes 16, 26 and 36 from accumulating charges when they are nonconducting. Load resistors 10, 20 and 30 respectively are coupled to the base-one terminals 12, 22 and 32 of transistors $T_1$, $T_2$ and $T_3$. The other ends of said load resistors are coupled to ground. Output terminals *a'*, *b'* and *c'* are respectively coupled to the base-one and load resistor junctions associated with transistors $T_1$, $T_2$ and $T_3$. Load resistors 10, 20 and 30 and associated output terminals *a'*, *b'* and *c'* may be coupled to the base-two terminals of their respective transistors if outputs of opposite polarities are desired.

In the operation of the exclusive-selector gating circuit of FIG. 1, it is desired that an input pulse coupled to any one of the input terminals *a*, *b* or *c* will energize only a correspondingly lettered one of the output terminals *a'*, *b'* or *c'* and that all other output terminals will be unenergized. It also is desired that the energized output line remain energized until an input pulse is received on any different one of the input terminals. Assuming that the input terminals *a*, *b* and *c* receive input pulses in the order represented by the pulses of respective waveforms a, b and c of FIG. 2, and assuming that transistor $T_3$ now is conducting, the emitter voltage of transistor $T_3$, FIG. $2v_3$, is at a conduction voltage $vc$, and a conduction current, FIG. $2i_3$, is flowing through the emitter to base-one junction and through load resistor 30 to ground.

Current flow through resistor $R_3$ causes a voltage drop thereacross, and capacitor $c_3$, which is in shunt with resistor $R_3$, is charged to this voltage. Because of the voltage divider action of resistors $R_d$ and $R_3$, the emitters of non-conducting transistors $T_1$ and $T_2$ are at a quiescent voltage $v_q$ which is selected to be lower than the peak voltage $v_p$.

Figure 2:
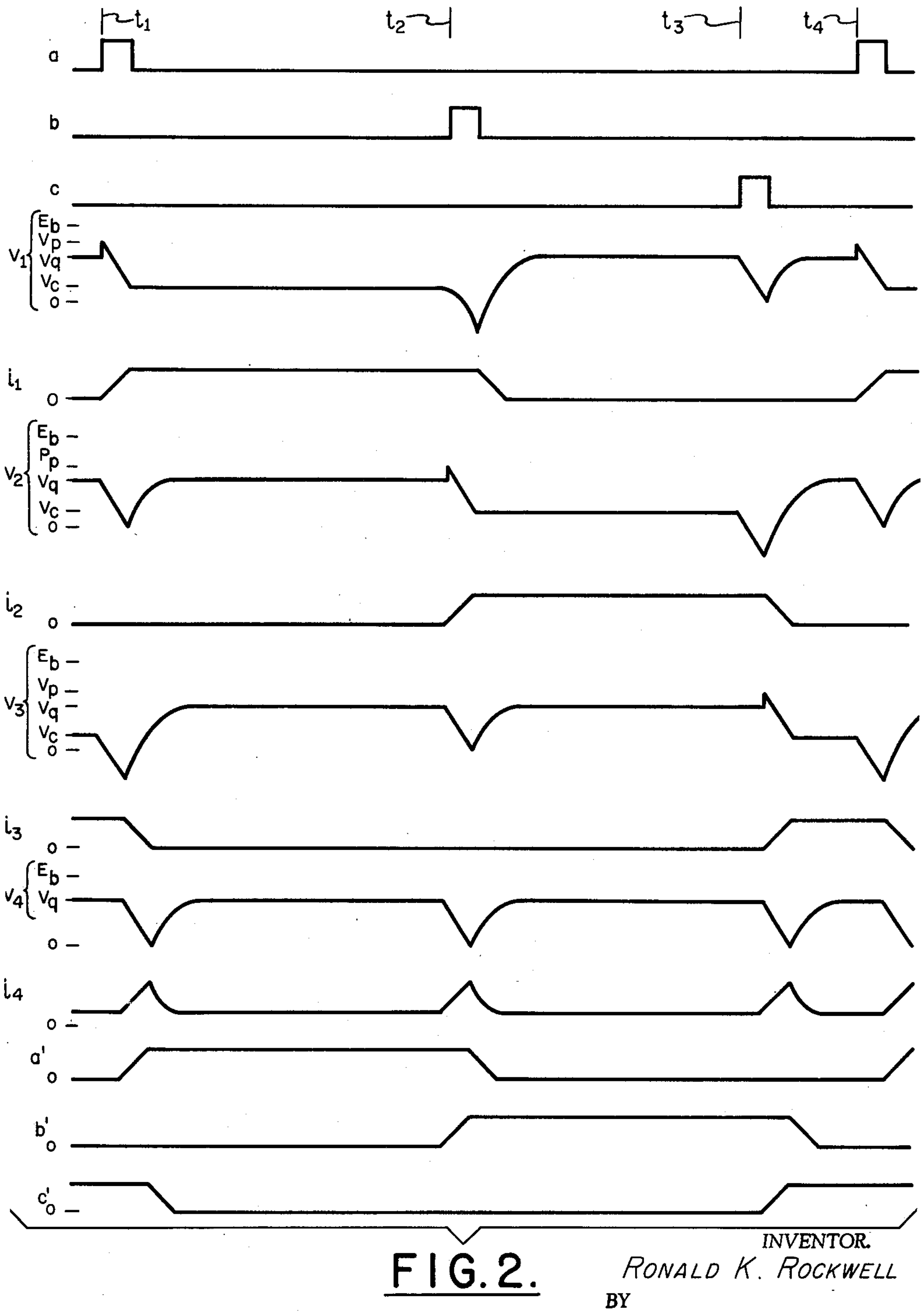
FIG. 2 is a series of voltage and current waveforms to be found at various places in the circuit of FIG. 1 and is used in the explanation of the operation of the circuit.

At time $t_1$, FIG. 2, a positive pulse is received at terminal *a* and is coupled through capacitor 15 to the emitter 11 of transistor $T_1$. Capacitor 15 differentiates this pulse so that the potential at emitter 11, FIG. $2v_1$, is a spike which exceeds the peak voltage $v_p$ on the emitter characteristic curve. Transistor $T_1$ commences to conduct, FIG. $2i_1$, and the current through the emitter to base-one junction causes the emitter voltage $v_1$ to fall toward the conduction voltage $v_c$.

Coupling capacitor $c_1$ couples this voltage drop to junction point J, causing an increasing current $i_4$ to be drawn through resistor $R_d$ which comprises the higher voltage portion of the voltage divider means. This voltage drop also is coupled through the capacitors $c_2$ and $c_3$ to the respective emitters 21 and 31 of transistors $T_2$ and $T_3$. This voltage drop coupled to emitter 31 of transistor $T_3$ combines with the voltage drop stored in capacitor $c_3$ to drop the emitter potential of transistor $T_3$ to a potential low enough to cause transistor $T_3$ to cease conducting. This in turn decreases the current $i_4$ through resistor $R_d$ and allows the potential $v_4$ at junction point J to rise to the level $v_q$ as capacitor $c_1$ charges, FIG. $2v_4$. When transistor $T_3$ ceases conduction, capacitor $c_3$ discharges through resistor $R_3$ and the emitter potential $v_3$ of transistor $T_3$ rises exponentially from the conduction voltage $v_c$ to the quiescent voltage $v_q$ established at point J by the voltage divider action of resistors $R_d$ and $R_1$. Transistor $T_1$ now is operating in the stable positive slope region of its emitter characteristic curve and will continue to conduct in the absence of a disturbing influence. The conduction current through transistor $T_1$ flows through load resistor 10 and energizes output terminal *a'*, FIG. 2*a'*. During the operation just described, the emitter potential $v_2$ of transistor $T_2$ remains below the peak voltage point so that transistor $T_2$ remains cut off, FIG. $2v_2$.

At time $t_2$ a second pulse, FIG. 2*b*, is received at input terminal *b*. As may be seen from the waveforms $2v_2$ and $2v_1$, the operation of the circuit is substantially identical to the operation just described in that the emitter potential $v_2$ of transistor $T_2$ is a spike which exceeds the peak voltage point on its characteristic curve so that transistor $T_2$ commences conducting, FIG. $2i_2$. The voltage drop at emitter 21 of transistor $T_2$ is coupled through capacitor $c_2$ to junction point J and is coupled through capacitors $c_1$ and $c_3$ to emitters 11 and 31 of transistors $T_1$ and $T_3$. The voltage drop stored across capacitor $c_1$ when conduction current flowed through resistor $R_1$ is combined with the voltage drop coupled from emitter 21 and lowers the potential on emitter 11 of transistor $T_1$ to a potential below that required to maintain transistor $T_1$ in a conduction state. Transistor $T_1$ therefore stops conducting, waveforms $2v_1$ and $2i_1$, which in turn decreases the current $i_4$ drawn through resistor $R_v$. This rises the potential at junction point J, FIG. $2v_4$, and permits transistor $T_2$ to continue conducting.

By following the waveforms of FIG. 2 at the times $t_3$ and $t_4$ it will be seen that the circuit of FIG. 1 will operate in the same manner at these respective times so that only transistor $T_3$ will conduct after the receipt of the third input pulse and only transistor $T_1$ will conduct after the receipt of the fourth input pulse.

Figures 3, 4:
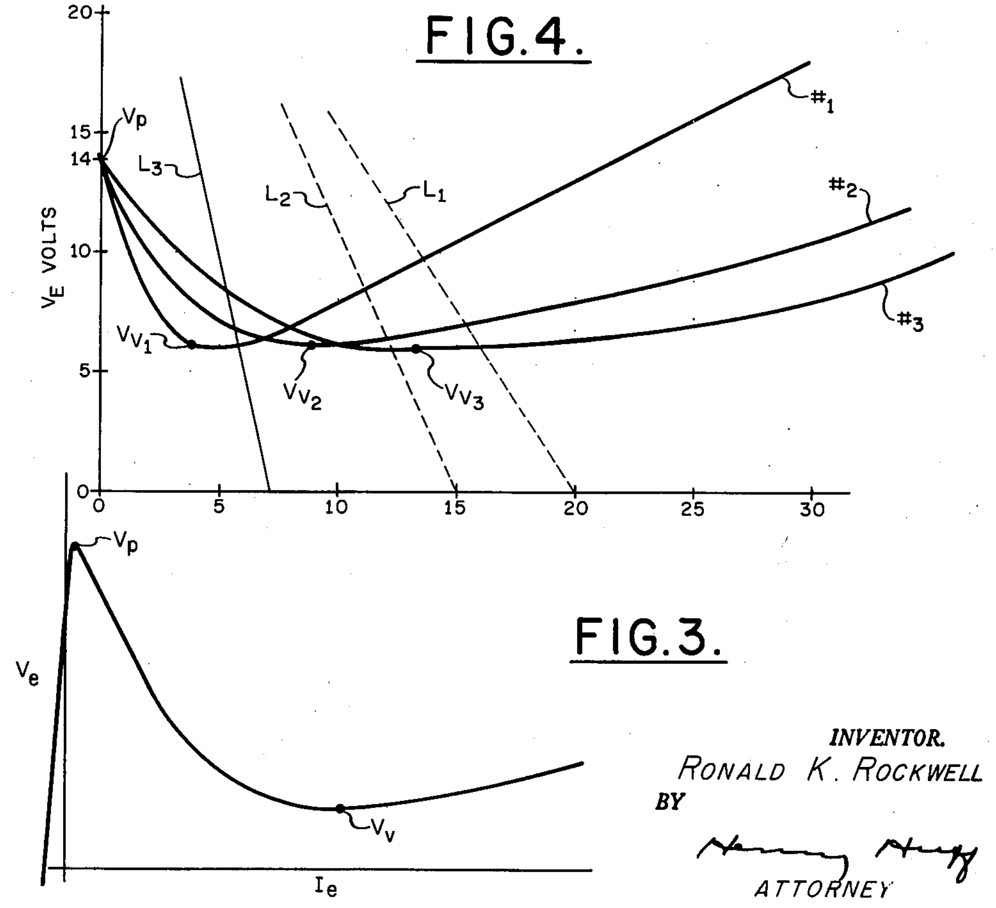
FIG. 3 is a curve illustrating a typical emitter characteristic curve of a unijunction transistor; and, FIG. 4 is a graph having a number of curves which represent different composite emitter characteristic curves for the circuit of this invention and is used to explain the desired operating conditions for the circuit of this invention.

It should be noted that the ratio of the resistances for the voltage divider comprised of resistor $R_d$ and $R_1$, $R_2$ and $R_3$ must be selected so that when any one transistor is conducting, the voltage at point J is below the peak point $v_p$ on the characteristic curve of FIG. 3 to prevent the other two transistors from conducting. The total resistance of resistor $R_d$ in series with resistor $R_1$, $R_2$ or $R_3$ must be chosen so that the load line established for a single transistor intersects the characteristic curve to the right of the valley point in the stable operating region of a transistor. This requirement sets a maximum value for the total resistance of the resistors $R_d$ in series with resistors $R_1$, $R_2$ or $R_3$.

Precautions must be taken to assure that the circuit will operate in the stable state with only one transistor conducting at a time. As mentioned previously, unconditionally stable operation of unijunction transistor circuits occurs only when the load line intercepts the emitter characteristic curve in the positive slope region to the right of the valley point. Referring to FIG. 4, it now will be explained how a load line of the composite circuit of FIG. 1 is chosen to assure that only one transistor will conduct at a time, thus assuring the exclusive-selector feature of this invention. Curve 1 of FIG. 4 is the emitter characteristic curve of the composite circuit of FIG. 1 when only one transistor is conducting, curve 2 is the composite emitter characteristic curve when two transistors are conducting at the same time, and curve 3 is the composite emitter characteristic curve when all three transistors are conducting at the same time. The emitter voltages and currents plotted in FIG. 4 are the values which would be read at junction point J of FIG. 1. If a load line $L_1$ were chosen, the valley points $V_{v1}$, $V_{v2}$ and $V_{v3}$ all lie to the left of the load line $L_1$ and the circuit would operate stably at the points of intersection of load line $L_1$ with curve 1, 2 or 3 since the load line intercepts all three curves in their stable positive slope saturation regions. This means that one, two or three of the transistors could conduct at the same time. If load line $L_2$ were chosen, all three transistors could not conduct simultaneously because load line $L_2$ intercepts curve 3 in the unstable negative resistance region to the left of valley point $V_{v3}$. However, any two transistors could conduct simultaneously because the load line $L_2$ intercepts curves 1 and 2 in their stable regions to the right of valley points $V_{v1}$ and $V_{v2}$. Therefore, to assure stable operation of the composite circuit of FIG. 1 with only one transistor conducting, a load line such as $L_3$ must be chosen so that valley points $V_{v2}$ and $V_{v3}$ fall to the right of the load line. This criterion sets a minimum value for resistors $R_d$, $R_1$, $R_2$, and $R_3$. Having now selected the values for the resistors $R_d$, $R_1$–$R_3$, the capacitors $c_1$, $c_2$ and $c_3$ must be large enough to couple the emitter voltage drop of the newly triggered transistor to the emitter of the presently conducting transistor in order to supply the proper gating action to cut off the presently conducting transistor.

Although FIG. 1 shows only three transistors and three associated input and output terminals, it should be understood that a larger or smaller number of identical stages may be employed if desired.

In an embodiment of the invention constructed substantially as illustrated in FIG. 1, the unijunction transistors were of the 2N492 type, manufactured by General Electric Co., the diodes 16, 26 and 36 were of the type 1N457. The values of the remainder of the circuit elements were as follows:

| | | |
|---|---|---|
| Resistor $R_d'$ | ohms | 820 |
| Resistors $R_1$, $R_2$, $R_3$ | do | 470 |
| Resistors **18**, **28** | do | 22,000 |
| Resistor **38** | do | 150,000 |
| Resistors **10**, **20**, **30** | do | 100 |
| Capacitors $c_1$, $c_2$, $c_3$ | microfarads | 2 |
| Capacitors **15**, **25**, **35** | do | 3300 |
| $E_b$ potential | volts | 30 |

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. An exclusive-selector gating circuit comprising,
   a plurality of three terminal devices each having a negative resistance characteristic over a predetermined range of potentials applied between the first and second ones of its terminals,
   a plurality of input lines each one respectively coupled to the first terminal of one of said devices,
   a source of positive potential coupled between the third and second terminals of each of said devices,
   voltage dividing means having series connected higher and lower voltage portions coupled between the positive terminal of said source and the first terminal of each device,
   isolating means between said first terminal of each device and said voltage dividing means for preventing input pulses from coupling between said devices,
   a plurality of coupling capacitors each coupled between a respective isolating means and the junction of said higher and lower voltage portions of said voltage divider means,
   and a plurality of load resistors and associated output terminals respectively coupled between said source and one of the latter two terminals of each of said devices,
   the circuit parameters of said gating circuit being chosen with respect to the operating characteristics of said device to establish a given load line on the composite emitter characteristic curves representing all possible conducting combinations of said devices,
      said load line intersecting only one of said curves to the right of its valley point.

2. The combination claimed in claim 1 wherein each of said load resistors and associated output terminal is coupled between said source of positive potential and the third terminal of a respective one of said devices.

3. A gating circuit for receiving input pulses on any one of a plurality of input lines and producing output pulses only on the respective output line which corresponds to the input line last energized, said circuit comprising
   a plurality of unijunction transistors each having an emitter and base-one and base-two terminals,
   a plurality of input lines each one coupled to a respective emitter terminal of one of said transistors,
   a source of positive potential coupled between the base-two and base-one terminals of each one of said transistors,
   a unidirectional current conduction device coupled to the base-one terminal of each transistor and poled for conduction through the emitter to the base-one terminal of each transistor,
   voltage divider means coupled between the positive terminal of said source and each one of said unidirectional conduction devices,
      said voltage divider means comprising a higher voltage portion and a plurality of lower voltage portions,
      each lower voltage portion being coupled between said higher voltage portion and a respective unidirectional conduction device,
   a plurality of coupling capacitors each shunting a respective one of said voltage divider lower portions,
   a resistor and an output terminal coupled between said source and the base-two terminal of each one of said transistors,
   the potential of said source, said base-two resistor and said voltage divider means being proportioned with respect to the characteristics of said transistors to permit conduction of only one transistor at a time in response to said input pulses.

4. A gating circuit for receiving input pulses on any one of a plurality of input lines and producing output gating pulses only on the respective output line which corresponds to the input line last energized, said circuit comprising
   a plurality of unijunction transistors each having an emitter and base-one and base-two terminals,
   a plurality of input lines each one coupled to a respective emitter terminal of one of said transistors,
   a resistor coupled to the base-one terminal of each of said transistors,
   a source of potential coupled between the base-two terminal and the respective base-one resistor of each one of said transistors,
   a unidirectional current conduction device coupled to the base-one terminal of each transistor and poled for conduction through the emitter to base-one terminal in each transistor,
   voltage divider means coupled between said source and each one of said unidirectional conductor devices,
      said voltage divider means comprising a higher voltage portion and a plurality of lower voltage portions each one coupled between said higher voltage portion and a respective unidirectional conduction device,
   a plurality of coupling capacitors each shunting a respective one of said voltage divider lower portions,
   and a plurality of output terminals respectively coupled to the base-one terminals of each of said transistors,
   the potential of said source, said base-one resistor and said voltage divider means being proportioned with respect to the characteristics of said transistors to permit conduction of only one transistor at a time in response to said input pulses.

5. An exclusive-selector gating circuit comprising
   a plurality of three terminal devices each having a negative resistance characteristic over a predetermined range of potentials applied between the first and second ones of its terminals,
   a plurality of input lines each one respectively coupled to the first terminal of one of said devices,
   a plurality of load resistors each one coupled to a respective second terminal of one of said devices, a source of positive potential coupled between the third electrode and said load resistor of each device,
   means including a voltage divider comprised of a first resistor having one terminal coupled to the positive side of said source and a plurality of second resistors each having one terminal coupled to the other terminal of said first resistor and the other terminals of said second resistor coupled respectively to the first terminal of one of said devices,
   said last-named means further including a plurality of uniconducting current devices each respectively coupled between the first terminal of one of said devices and the second terminal of one of said second resistors,
   a plurality of capacitive means each one coupled between the junction of said first and second resistors and a respective first terminal of one of said devices,
   and a plurality of output terminals each one respectively coupled to the second terminal of one of said devices,
   the circuit parameters of said gating circuit being chosen with respect to the operating characteristics of said devices to establish a given load line on the composite emitter characteristic curves representing all possible conducting combinations of said devices,
      said load line intersecting only one of said curves to the right of its valley point.

No references cited.